(12) United States Patent
Kvisteroey et al.

(10) Patent No.: US 6,319,729 B1
(45) Date of Patent: Nov. 20, 2001

(54) METHOD FOR MANUFACTURING AN ANGULAR RATE SENSOR

(75) Inventors: Terje Kvisteroey; Henrik Jakobsen, both of Horten (NO)

(73) Assignee: Sensonor Asa (NO)

( * ) Notice: Subject to any disclaimer, the term of this patent is extended or adjusted under 35 U.S.C. 154(b) by 0 days.

(21) Appl. No.: 09/401,600

(22) Filed: Sep. 22, 1999

(30) Foreign Application Priority Data

Oct. 12, 1998 (EP) .................................................. 98308263

(51) Int. Cl.[7] .................................................. H01L 21/461
(52) U.S. Cl. ........................ 436/743; 438/742; 73/504.04
(58) Field of Search ........................ 438/743, 48, 49, 438/50, 51, 52; 257/232, 234, 414

(56) References Cited

U.S. PATENT DOCUMENTS 5,635,639    6/1997    Greiff et al. .
5,952,572 *  9/1999    Yamashita et al. ............... 73/504.04

FOREIGN PATENT DOCUMENTS

| 410 22 495 | 1/1992 | (DE) . |
| 0 598 477 | 5/1994 | (EP) . |
| 0 744 603 | 11/1996 | (EP) . |

* cited by examiner

Primary Examiner—David Nelms
Assistant Examiner—Dung A Le
(74) Attorney, Agent, or Firm—Boyle, Fredrickson, Newholm, Stein & Gratz, S.C.

(57) ABSTRACT

A method of manufacturing an angular-rate sensor by fabricating components of the angular-rate sensor on a silicon substrate, the components of the angular rate sensor including one or more masses, a support beam and buried conductors. Detection means are provided and the components are sealed in a cavity between a first glass plate and a second glass plate by anodic bonding. This enables angular rate sensors to be fabricated using low cost silicon wafers.

11 Claims, 6 Drawing Sheets

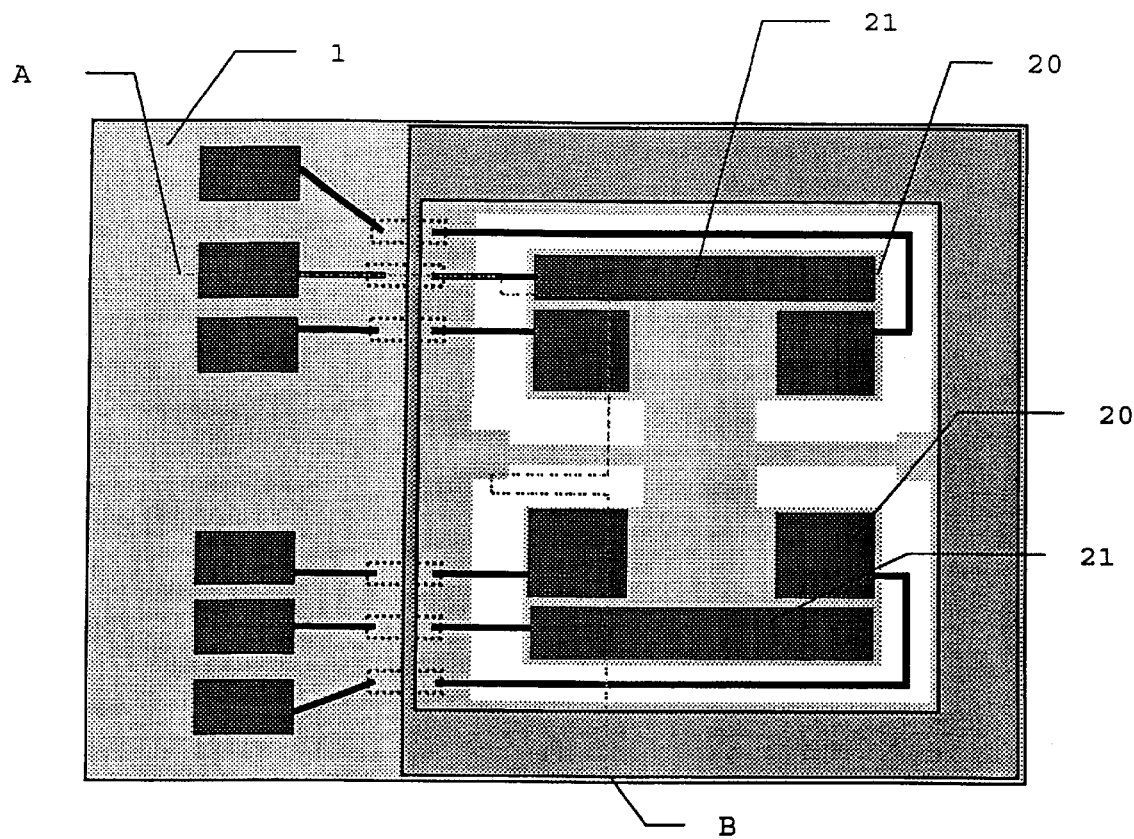
Figure 1- Angular rate sensor device. The cross sections in the following figures are performed along line AB.
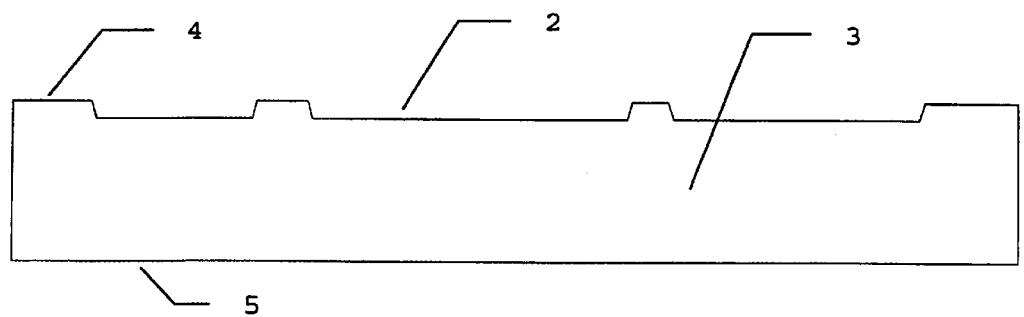
Figure 2- Schematic cross section after process step 1, along line AB shown in figure 1.

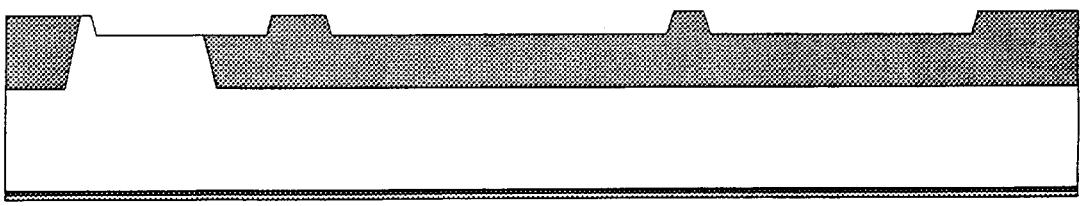
Figure 3- Schematic cross section after process step 2, along line AB shown in figure 1.
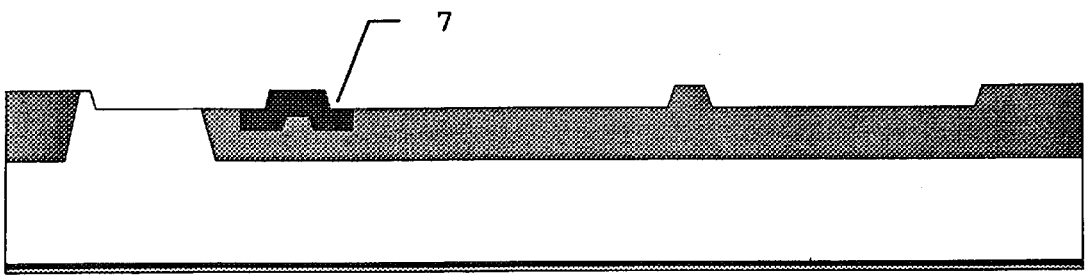
Figure 4- Schematic cross section after process step 3, along line AB shown in figure 1.
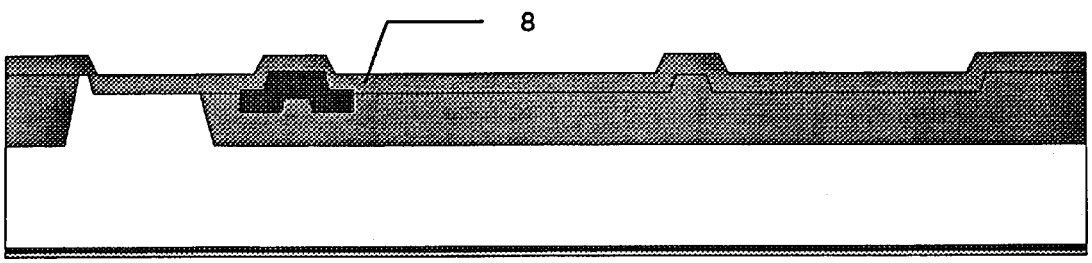
Figure 5- Schematic cross section after process step 4, along line AB shown in figure 1.
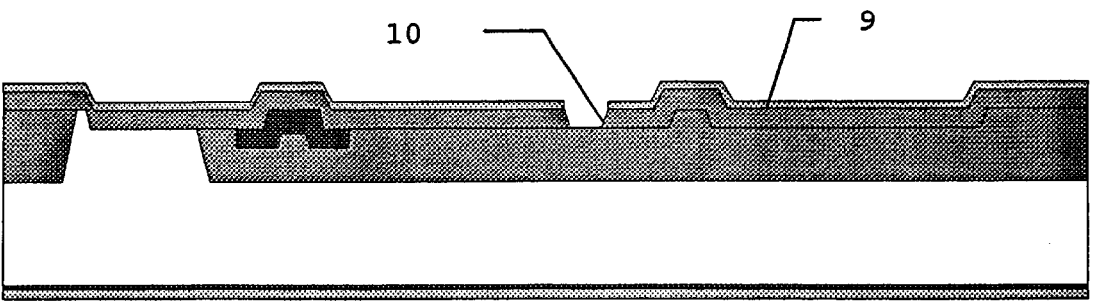
Figure 6- Schematic cross section after process step 5, along line AB shown in figure 1.

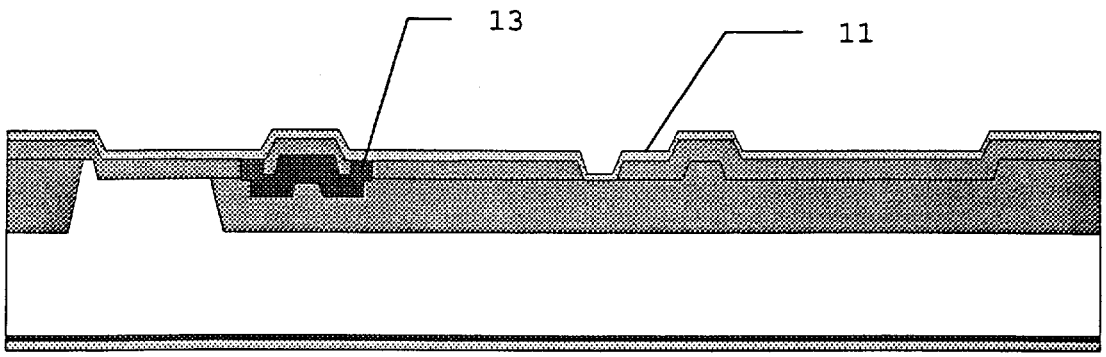
Figure 7- Schematic cross section after process step 6, along line AB shown in figure 1.
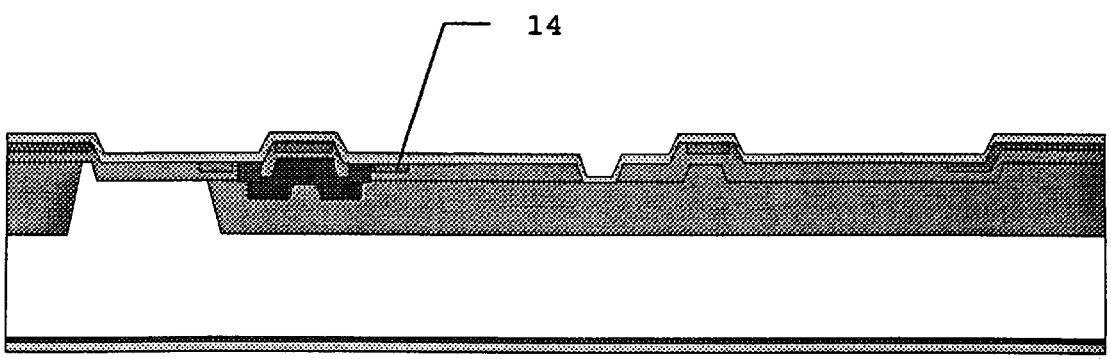
Figure 8- Schematic cross section after process step 7, along line AB shown in figure 1.
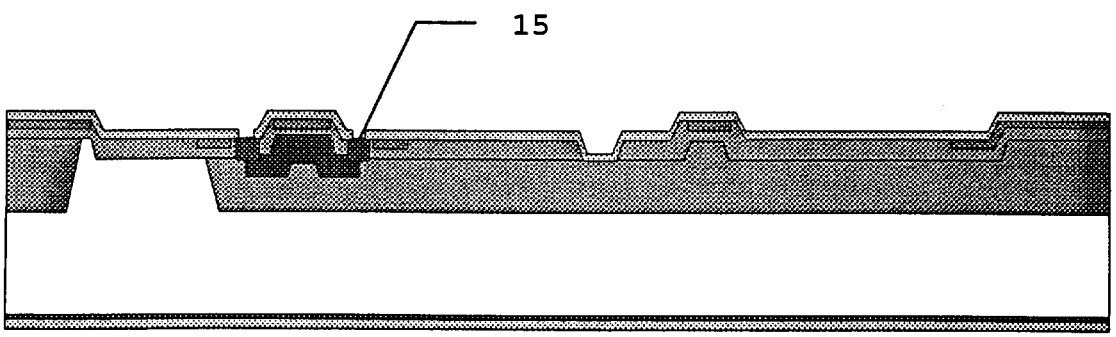
Figure 9- Schematic cross section after process step 8, along line AB shown in figure 1.

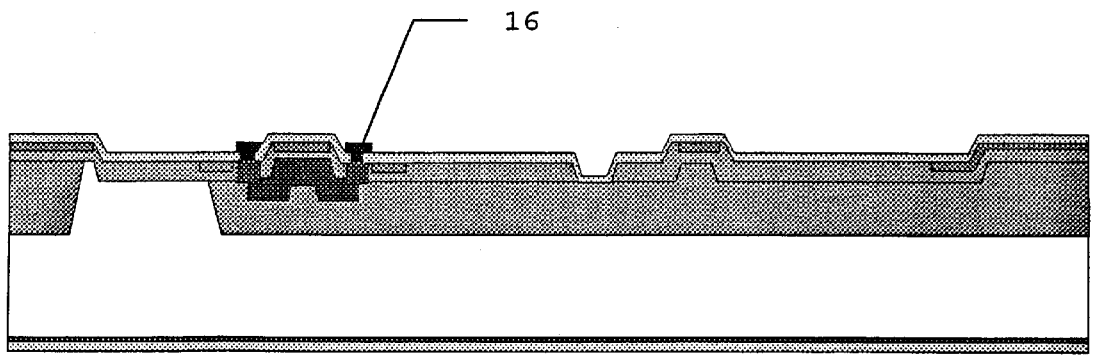
Figure 10- Schematic cross section after process step 9, along line AB shown in figure 1.
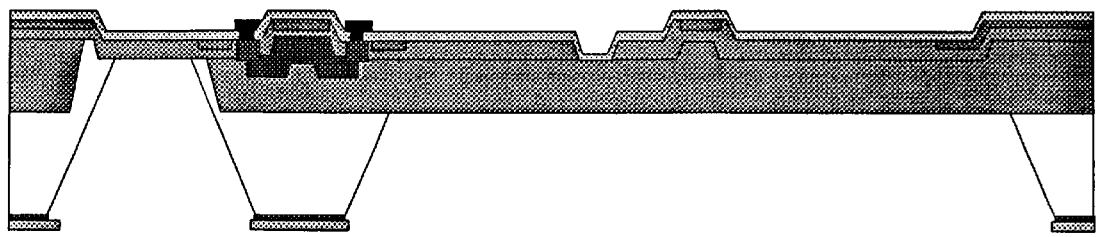
Figure 11- Schematic cross section after process step 10, along line AB shown in figure 1.
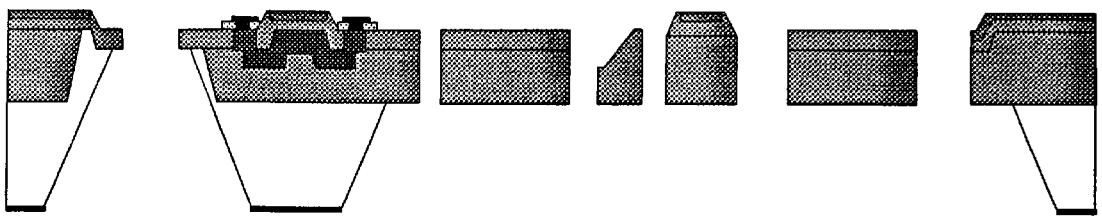
Figure 12- Schematic cross section after process step 11, along line AB shown in figure 1.

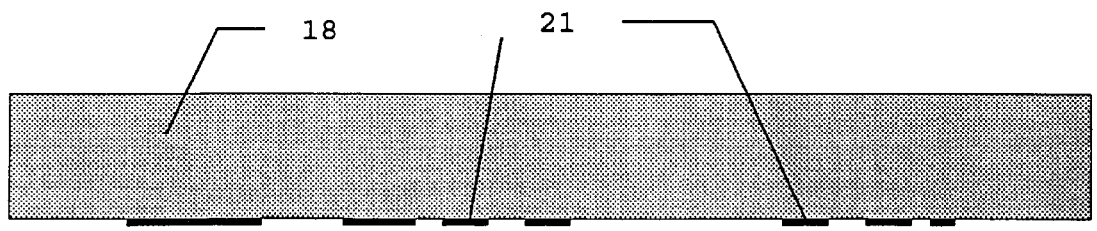
Figure 13- Schematic cross section after process step 12, along line AB shown in figure 1.
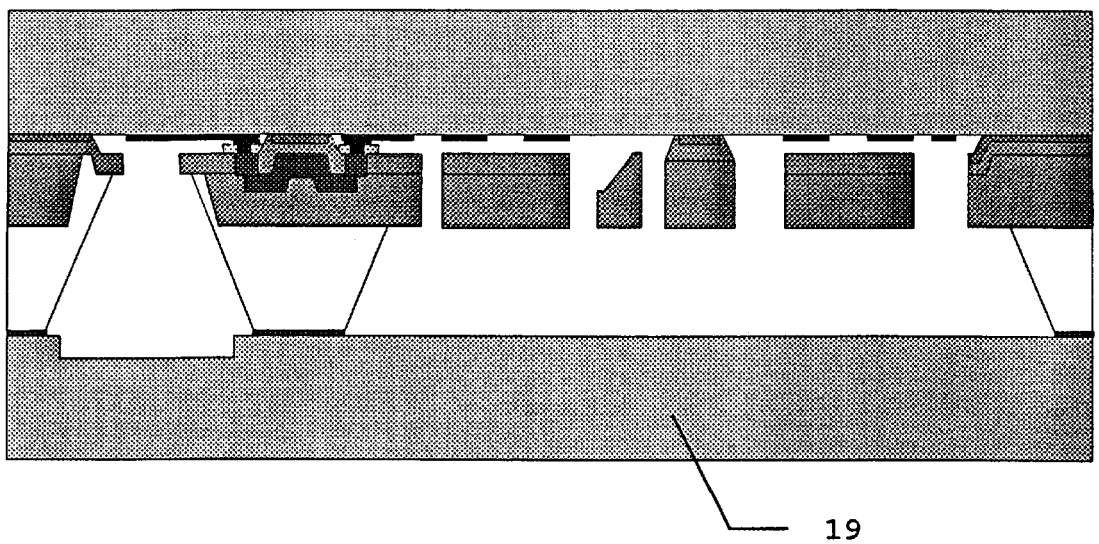
Figure 14- Schematic cross section after process step 13, along line AB shown in figure 1.

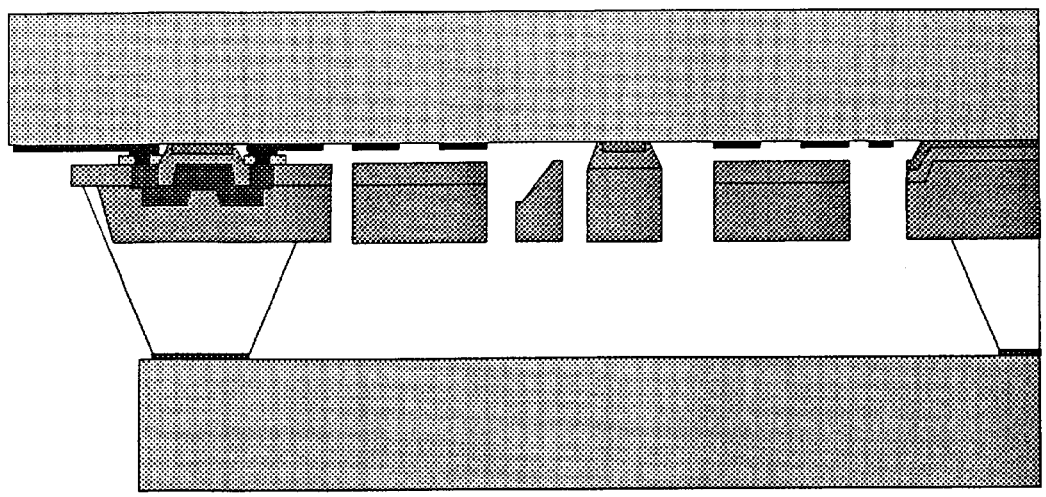
Figure 15- Schematic cross section after process step 14, along line AB shown in figure 1.

METHOD FOR MANUFACTURING AN ANGULAR RATE SENSOR

FIELD OF THE INVENTION

This invention relates to angular rate sensors and, more particularly, to a method of manufacturing an angular rate sensor.

BACKGROUND OF THE INVENTION

There is a considerable need for angular rate sensors for a variety of electronic measuring systems. For example, safety systems in cars for preventing injuries during rollover or skidding systems require devices for determining the rate of change of axial alignment of the vehicle. Current sensors providing appropriate signals for such systems are expensive to manufacture as they require complex designs and corresponding expensive production technology.

Some prior art devices employ electrostatic excitation of an element and the detection of a capacitance change movement of the element induced by the Coriolis effect. These devices have generally been made using silicon-on-insulator wafers or poly-silicon. The limitations of such arrangements are that their silicon wafers are extremely costly, or that poly-silicon devices are of poor manufacturing quality having non-uniform characteristics and built-in stresses that can cause unintended characteristics to occur, particularly in any sprung elements.

SUMMARY OF THE INVENTION

The present invention is directed towards overcoming some of the problems, both in terms of cost and manufacturing simplicity, of the prior art.

According to the present invention there is provided a method of manufacturing an angular-rate sensor comprising the steps of:

fabricating components of the angular-rate sensor on a silicon substrate, the components including one or more masses, a support beam and buried conductors;

providing detection means; and sealing the components in a cavity between a first glass plate and a second glass plate by anodic bonding.

The invention therefore makes it possible to fabricate angular rate sensors using low cost silicon wafers.

Preferably, the detection means are electrodes formed by metal deposition on the first glass plate.

Preferably, the masses, beam and substrate are in substantially parallel planes, and the method further comprises the step of asymmetrically etching the beam such that, in use, it has a tendency to bend in a direction having components both parallel and perpendicular to the parallel planes.

The method may further comprise the step of forming a n-type epitaxial layer over the buried conductors to protect the conductors from the anodic bonding.

The substrate is preferably a n-type single crystal silicon substrate.

Preferably, the buried conductors are fabricated by the steps of:

applying a photoresist mask to a surface of the substrate;

implanting ions into the substrate at gaps in the photoresist mask;

diffusing the ions into the substrate.

P-type contacts to the buried conductors may be provided by the steps of:

applying a photoresist mask to a surface of the substrate;

implanting ions into the substrate at gaps in the photoresist mask;

diffusing the ions into the substrate.

Preferably the anodic bonding step further comprises providing a passivation layer on the substrate.

The method may further comprise the step of aligning the substrate and the first glass plate such that the first and second electrodes form one or more capacitors.

BRIEF DESCRIPTION OF THE DRAWINGS

One example of the present invention will now be described with reference to the accompanying drawings, in which:

FIG. 1 is a schematic plan view of a device fabricated according to the process of the present invention;

FIG. 2 is a schematic cross-section of a silicon wafer after a first step in the process of the invention;

FIG. 3 is a schematic cross-section of the wafer of FIG. 2 after a second process step;

FIG. 4 is a schematic cross-section of the wafer of FIG. 3 after a third process step;

FIG. 5 is a schematic cross-section of a wafer according to FIG. 4 after a fourth process step;

FIG. 6 is a schematic cross-section of the wafer of FIG. 5 after a fifth process step;

FIG. 7 is a schematic cross-section of the wafer of FIG. 6 after a sixth process step;

FIG. 8 is a schematic cross-section of the silicon wafer of FIG. 7 after a seventh process step;

FIG. 9 is a schematic cross-section of the silicon wafer of FIG. 8 after an eighth process step;

FIG. 10 is a schematic cross-section of the wafer of FIG. 9 after a ninth process step;

FIG. 11 is a schematic cross-section of the wafer of FIG. 10 after a tenth process step;

FIG. 12 is a schematic cross-section of the wafer of FIG. 11 after an eleventh process step;

FIG. 13 is a schematic cross-section of a top glass wafer formed during a twelfth process step;

FIG. 14 is a schematic cross-section of the wafer of FIG. 12 and sheet of FIG. 13 after a thirteenth process step;

FIG. 15 is a schematic cross-section of the arrangement of FIG. 14 after a fifteenth process step.

DETAILED DESCRIPTION

An angular rate sensor 1 is fabricated using bulk silicon micromachining. The sensor 1 comprises two silicon masses 20 joined by a support beam, in this example, substantially in the plane of the substrate. The masses 20 and beam are arranged to have a tendency to bend in a direction that is neither perpendicular nor parallel to the plane of a substrate 3.

Thus, when electrostatic excitation is applied to the masses 20 in a direction perpendicular to plane of the substrate 3, the masses 20 vibrate substantially parallel to plane of the substrate 3. This results in the masses 20 experiencing a relatively large gyroscopic moment when the sensor is subject to rotation in the plane of the substrate 3. Rotation induced by the gyroscopic moment is therefore relatively large compared to prior art devices, which have different geometries, and a capacitive change caused by the rotation can be more easily detected.

The excitation generally occurs at a resonant frequency for the intended movement, which is typically in the range 4–10 kHz. The silicon masses 20 and their support structure are sealed between two, top and bottom, glass plates 18,19. The top glass plate 18 is provided with a metal pattern defining capacitor electrodes 21 for detecting the vibrations. The detection vibration is an out of plane angular vibration which is detected capacitively between the electrodes 21 on the top glass plate 18, shown in FIG. 13, and the masses 20.

Angular rate sensors may have various geometries and. designs and, referring to FIG. 1, an example of an angular rate sensor 1 has the geometry and design schematically shown.

The first step in the fabrication process (process step 1) is to define a recess 2 on a front surface 4 of a silicon wafer 3 which serves as an air gap for a number of sensing capacitors and requisite spacing in press contact and wire bond pad areas. A first photoresist mask layer is applied to the silicon wafer 3, which is then treated by reactive ion etching (RIE) to form a recess having a depth of a few um depth. FIG. 2 illustrates a schematic cross section of the silicon wafer 3 after process step 1, along line AB shown in FIG. 1.

It can be appreciated that a recess depth of, for example, 2 $\mu$m, in combination with capacitor electrodes 5 having a thickness of 1 $\mu$m, results in a nominal capacitor gap of 1 $\mu$m. Of course, a gap of a different dimension may be required.

Process step 2 is to define the thickness of the masses 20, the springs, a thin support pedestal, and a 10 n-well which isolates p-type buried conductors formed later. The masses 20 are defined by an implant of phosphorous which is deeply diffused to obtain the correct thickness. Typical thickness may be in the range 10–20$\mu$m. The p-n junction formed by this phosphorous diffusion and the p-type substrate is reverse biased during a subsequent wet etching process, thus electrochemically forming the thickness of the masses 20.

Silicon oxide is grown thermally and patterned using standard photolithography and a second mask layer. The silicon oxide is patterned by etching in a HF based solution and is used as mask for the implantation process. Phosphorous is implanted on the front surface 4, and the rear surface 5 is implanted with boron to reduce the series resistance of the wafer 3. Phosphorous is diffused to a specified thickness, and the oxide is re-oxidised to create a shallow recess in the silicon wafer 3 for pattern recognition.

The final step in this sequence is to etch off the silicon oxide on the front surface 4 of the wafer 3. The oxide on the rear side 5 of the wafer 3 is not etched as it is used as mechanical protection for subsequent processing. A simplified schematic cross section after this process step is shown in FIG. 3.

Process step 3 is to provide p-type conductors 7 to connect wire bond pads with their corresponding electrodes via the press contacts obtained after a later anodic bonding step. The p-type diffusion pattern is defined by a third photoresist mask layer and the conductors 7 are provided by boron implantation followed by thermal diffusion. Implantation is performed, and the photoresist is stripped. Boron is then diffused to the specified thickness. Finally, the oxide on the front side of the wafer is etched in buffered HF. A schematic cross section of the silicon wafer 3 after process step 3 is shown in FIG. 4.

Process step 4 is to grow an n-type epitaxial layer 8 on front surface 4 of the silicon wafer 3 in order to bury the conductors 7. A single crystal n-type silicon layer 8 is grown epitaxially on the entire front surface 4 of the wafer 3. A schematic cross section of the wafer after process step 4 is shown in FIG. 5.

It should be noted that this epitaxial layer adds to the thickness of the mass and the spring elements. The thickness of the springs as well as the masses are defined by the diffusion in process step 2 and the thickness of the epitaxial layer.

Process step 5 is to etch a portion of the springs in order to attain an asymmetric spring cross section. An indentation 10 in the upper surface of the asymmetric springs is provided by a wet etch or a dry etch (as seen in the diagrams). This alters the rigidity of the springs to provide a weakness at a certain angle to the major plane of the springs. This angle is typically 4 degrees.

First, a masking oxide layer 9 is grown thermally. This oxide is patterned on the front surface 4 by using a fourth mask layer. The wet etch or a dry etch is then performed using an anisotrophic etch process to provide the indentation 10. A schematic cross section of the wafer 3 after process step 5 is shown in FIG. 6.

Process step 6 is to provide electrical connection to the buried conductors 7 through the epitaxial layer 8. Diffusion contacts 13 are fabricated by boron implantation, with photoresist as masking material which is patterned using a fifth mask layer. The implantation is typically performed through a thin silicon oxide layer 11. After the implantation, the photoresist is stripped. Boron is then diffused to the specified thickness, in order to contact the buried p-type conductors. A schematic cross section of the wafer 3 after the process step 6 is shown in FIG. 7.

Process step 7 is to reduce the contact resistance to the n-type epitaxial layer 8, improve the electrical metal contact to the n-type regions, and improve the electrochemical etch stop process.

A shallow phosphorous implantation layer 14 is provided using a sixth photoresist mask. After the implantation, the photoresist is stripped and the n+implanted layer 14 is annealed. A schematic cross section of the wafer 3 after this process step 7 is shown in FIG. 8.

Process step 8 is to make contact holes 15 for the metal contacts 13. Contact holes 15 are defined using a seventh photoresist and silicon oxide mask layer which is etched in a HF based solution. A schematic cross section of the wafer 3 after this process step 8 is shown in FIG. 9.

Process step 9 is to deposit and pattern metal for connections and to ensure an ohmic contact to both the p-type and n-type diffusion layers. A high purity aluminium layer 16 is vacuum deposited in the contact holes 15. Photoresist is used to pattern the aluminium, using an eighth masking layer. The aluminium is etched by a wet etching process. A schematic cross section of the wafer 3 after this process step 9 is shown in FIG. 10.

Process step 10 is to pattern the rear surface 5 with silicon oxide which is used as a mask for the wet etching of silicon and to perform the etching in order to obtain membranes (in the thickness of the mass diffusion) and thin pedestals.

Silicon is etched from the rear surface 5 by anisotropic etching. The thickness of the masses and the springs is controlled by means of an electrochemical passivation technique. The etch stop is achieved by applying a reverse bias on the p-n junctions between the p-type substrate and the n-type epitaxial layer or n-type well.

The rear surface oxide definition is provided by a ninth mask layer. Photoresist is used as pattern definition for the oxide, which is subsequently etched by RIE or by wet etching in a HF based solution. The photoresist is removed prior to the wet etching of the bulk silicon.

The thickness of the spring elements, masses and the thin pedestals will typically be in the range of 12–30 µm, including the epitaxial layer thickness. A schematic cross section of the wafer 3 after this process step 10 is shown in FIG. 11.

Process step 11 starts by removing the oxide in the anodic bonding areas and on the free mass and spring structures.

Later triple-stack anodic bonding in process step 13 consists of bonding glass to bare silicon or the thin oxide on both sides of the silicon wafer 3. The passivation silicon oxide layer is therefore removed from the glass attachment areas. The pattern of this area is defined by a tenth photoresist mask layer. Oxide is etched in HF based solution.

Process step 11 proceeds by releasing the masses and the spring elements of the sensor and exposing the wire bond pad areas by perforating the membranes. The masses and the springs are released by perforating the membrane with RIE. The etching area is defined by an eleventh photoresist mask. After etching, the resist is stripped.

It should be noted that the masses and the springs all have the same thickness, defined by the sum of the mass diffusion and the n-type epitaxial layer 8. A schematic cross section of the wafer 3 after this process step 11 is shown in FIG. 12.

Process step 12 is to deposit a pattern on the top glass plate 18 for the metal for wire bond pads, connections, the electrodes 21 of the detection capacitors and excitation elements.

First, a thin adhesion layer of a suitable material is deposited. Thereafter, high purity aluminium is vacuum deposited on the top glass plate 18. Photoresist is used to pattern the aluminium, using a twelfth masking layer. The aluminium is etched. A schematic cross section of the top glass plate 18 after this process step 12 is shown in FIG. 13.

Process step 13 is to provide the sensor gap, the press contacts and to hermetically seal the mechanical structure cavity.

Triple-stack anodic bonding is used to seal the silicon wafer between the top glass plate 18 and a bottom glass plate 19 to obtain a mechanically rigid structure, and a low pressure (vacuum) atmosphere for the sensor. The sawing steps required to free the wire bond pads areas are performed after the anodic bonding. The silicon wafer 3 is placed between the two glass plates 18,19, and the patterned top glass plate 18 is aligned and bonded to the silicon wafer by use of an aligner bonder equipment. The two glass-silicon junctions are anodically bonded simultaneously. A schematic cross section of the device after this process step 13 is shown in FIG. 14.

Process step 14 is to release and expose the wire bond pads. The wire bond pads are released and exposed by sawing along bottom glass scribe lines. Finally, process step 15 is to release the sensor dies. The sensor dies are released by sawing along the bottom glass scribe lines. A schematic cross section of the device after this process step 15 is shown in FIG. 15.

In an alternative example, the recesses, formed in the silicon substrate 3 in the first step of the process described above, are formed in the glass plate 18. Various thicknesses for the mass and spring elements may also be selected.

The rotation caused by a gyroscopic moment may alternatively be detected by peizo-electric means. Although the capacitor electrodes would not, therefore, be required, many of the above steps remain the same. In particular, anodic bonding and the preparatory steps before the bonding are used.

Generally, the above method of manufacture requires far fewer steps than prior art processes, making manufacture simpler and cheaper. Also, low capacitance connections are provided from inside the cavity to the outside through the buried conductors. This avoids the need for a more expensive silicon on insulator substrate and minimises parasitic capacitance.

What is claimed is:

1. A method of manufacturing an angular-rate sensor comprising the steps of:

fabricating components of the angular-rate sensor on a silicon substrate, the components including one or more masses, a support beam and buried conductors, wherein p-type contacts to the buried conductors are provided by the steps of applying a photoresist mask to a surface of the substrate; implanting ions into the substrate at gaps in the photoresist mask; and diffusing the ions into the substrate;

providing detection means; and sealing the components in a cavity between a first glass plate and a second glass plate by anodic bonding.

2. The method of claim 1, wherein the detection means are electrodes formed by metal deposition on the first glass plate.

3. The method of claim 1, wherein the masses, beam and substrate are in substantially parallel planes, further comprising the step of asymmetrically etching the beam such that, in use, it has a tendency to bend in a direction having components both parallel and perpendicular to the parallel planes.

4. The method of claim 1, further comprising the step of forming a n-type epitaxial layer over the buried conductors to protect the conductors from the anodic bonding.

5. The method of claim 1, wherein the substrate is a ptype single crystal silicon substrate.

6. The method of claim 1, wherein the buried conductors are fabricated by the steps of:

applying a photoresist mask to a surface of the substrate;

implanting ions into the substrate at gaps in the photoresist mask;

diffusing the ions into the substrate.

7. The method of claim 1, wherein the anodic bonding step further comprises providing a passivation layer on the substrate.

8. The method of claim 7, wherein the method further comprises the step of removing the passivation layer in the contact area of the first glass plate and the substrate.

9. The method of claim 1, further comprising the step of aligning the substrate and the first glass plate such that the first and second electrodes form one or more capacitors.

10. The method of claim 1, wherein the substrate is a silicon on insulator substrate.

11. The method of claim 1, further comprising the step of providing at least one wire bond pad between interconnects on the silicon substrate and the first glass plate.

* * * * *